(12) United States Patent
Hosoya et al.

(10) Patent No.: US 8,507,585 B2
(45) Date of Patent: *Aug. 13, 2013

(54) NON-AQUEOUS PIGMENT INK

(75) Inventors: Tetsuo Hosoya, Ibaraki-ken (JP);
Hiroshi Hayashi, Ibaraki-ken (JP);
Yoshifumi Watanabe, Ibaraki-ken (JP);
Kazuyuki Ando, Ibaraki-ken (JP);
Marie Morinaga, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/990,379

(22) PCT Filed: Apr. 8, 2009

(86) PCT No.: PCT/JP2009/057192
§ 371 (c)(1),
(2), (4) Date: Oct. 29, 2010

(87) PCT Pub. No.: WO2009/142075
PCT Pub. Date: Nov. 26, 2009

(65) Prior Publication Data
US 2011/0046298 A1    Feb. 24, 2011

(30) Foreign Application Priority Data

May 23, 2008 (JP) ................. 2008-135274
Nov. 18, 2008 (JP) ................. 2008-294829

(51) Int. Cl.
*C08F 8/30* (2006.01)
*C08F 283/04* (2006.01)
*C08G 18/08* (2006.01)
*C08G 18/10* (2006.01)
*C08G 18/28* (2006.01)
*C08J 3/00* (2006.01)
*C08K 3/20* (2006.01)
*C08L 39/00* (2006.01)
*C08L 75/00* (2006.01)

(52) U.S. Cl.
USPC ........... 523/160; 523/161; 524/555; 524/589; 524/590; 524/591; 524/839; 524/840; 525/123; 525/455; 525/920

(58) Field of Classification Search
USPC ............. 523/160, 161; 524/589, 590, 591, 524/839, 840, 555; 525/123, 455, 920
See application file for complete search history.

(56) References Cited

U.S. PATENT DOCUMENTS

| 7,214,725 B2 | 5/2007 | Narayan-Sarathy et al. | |
|---|---|---|---|
| 2007/0173560 A1* | 7/2007 | Uozumi | 523/160 |
| 2009/0092801 A1 | 4/2009 | Sato et al. | |
| 2010/0136236 A1* | 6/2010 | Hosoya et al. | 427/261 |
| 2012/0083567 A1* | 4/2012 | Hosoya et al. | 524/516 |
| 2012/0220702 A1* | 8/2012 | Hosoya et al. | 524/88 |

FOREIGN PATENT DOCUMENTS

| CN | 101001905 A | 7/2007 |
|---|---|---|
| CN | 101007917 A | 8/2007 |
| CN | 101154038 A | 4/2008 |
| EP | 1 205 815 A1 | 5/2002 |
| EP | 1 502 935 A1 | 2/2005 |
| JP | 10-060353 A | 3/1998 |
| JP | 2000-119361 A | 4/2000 |
| JP | 2004-231870 A | 8/2004 |
| JP | 2005-239947 A | 9/2005 |
| JP | 2007-131753 A | 5/2007 |
| JP | 2007-197500 A | 8/2007 |
| JP | 2007-277397 A | 10/2007 |
| JP | 2008-019333 A | 1/2008 |
| TW | 200808918 A | 2/2008 |

OTHER PUBLICATIONS

Form PCT/IB1338 (Notification of Transmittal of Translation of the International Preliminary Report on Patentability (Chapter I or Chapter II of the Patent Cooperation Treaty)) for International Application No. PCT/JP2009/057192, with a mailing date of Jan. 20, 2011, one (1) page.

English translation of the International Preliminary Report on Patentability (Chapter I of the Patent Cooperation Treaty), issued Jan. 11, 2011, for International Application No. PCT/JP2009/057192, eight (8) pages.

Search Report, issued on Sep. 4, 2012, in the counterpart European Application, Application No. EP 09 75 0437, four (4) pages.

Official Action, issued on Jan. 10, 2013, in the counterpart Chinese application, in Chinese, eight (8) pages.

* cited by examiner

*Primary Examiner* — Patrick Niland
(74) *Attorney, Agent, or Firm* — Nath, Goldberg & Meyer; Jerald L. Meyer; Sanjana Mangalagiri

(57) ABSTRACT

A non-aqueous pigment ink comprising a pigment, a non-aqueous solvent, and non-aqueous resin dispersion microparticles having a pigment dispersion capability, wherein the non-aqueous resin dispersion microparticles are an acrylic polymer comprising an alkyl (meth)acrylate unit having an alkyl group of 12 or more carbon atoms and a (meth)acrylate unit having a urethane group. The acrylic polymer is a copolymer of a monomer mixture comprising an alkyl (meth)acrylate (A) having an alkyl group of 12 or more carbon atoms and a reactive (meth)acrylate (B) having a functional group capable of reacting with an amino group, wherein the urethane group is introduced by a reaction between the functional group capable of reacting with an amino group, an amino alcohol and a polyvalent isocyanate compound, and the mass ratio within the acrylic polymer between the copolymer portion and the introduced urethane group portions is within a range from 60:40 to 99:1.

8 Claims, No Drawings

NON-AQUEOUS PIGMENT INK

This is a National Phase Application filed under 35 U.S.C. §371 as a national stage of PCT/JP2009/057192, filed on Apr. 8, 2009, claiming the benefit of Japanese Patent Application 2008-135274, filed on May 23, 2008, and claiming the benefit of Japanese Patent Application 2008-294829, filed on Nov. 18, 2008, the content of each of which is hereby incorporated by reference in its entirety.

TECHNICAL FIELD

The present invention relates to a non-aqueous pigment ink, and relates particularly to a non-aqueous pigment ink that is suitable for use in an inkjet recording system.

BACKGROUND ART

The coloring materials for inks used in inkjet recording systems can be broadly classified into materials that use pigments and materials that use dyes, and there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit good drying properties to aqueous inks, and also display excellent printability.

In non-aqueous inks, a pigment dispersant that dissolves in the solvent is generally used, but because this pigment dispersant improves the affinity between the solvent and the pigment, when the solvent penetrates into the recording paper, the pigment tends to be also drawn into the interior of the recording paper. As a result, the print density tends to fall, and show-through becomes more prevalent.

Accordingly, a non-aqueous pigment ink has been proposed that uses as a dispersant non-aqueous resin dispersion microparticles (NAD=Non Aqua Dispersion) having a pigment dispersion capability.

Prior Art Documents
Patent Documents
Patent Document 1: Japanese Patent Laid-Open No. 2007-197500

DISCLOSURE OF INVENTION

Problems Invention Aims to Solve

By using a pigment dispersant that does not dissolve in the solvent, the above non-aqueous ink is able to provide improved print density for printed items on plain paper. However, according to investigations conducted by the inventors of the present invention, further improvements are still required in terms of the pigment dispersion stability.

Accordingly, the present invention has an object of providing a non-aqueous pigment ink which suppresses show-through and improves the print density in printed items, and also exhibits excellent storage stability.

Means for Solution of the Problems

A first aspect of the present invention provides a non-aqueous pigment ink comprising a pigment, a non-aqueous solvent, and non-aqueous resin dispersion microparticles having a pigment dispersion capability, wherein
the non-aqueous resin dispersion microparticles are an acrylic polymer comprising an alkyl (meth)acrylate unit having an alkyl group of 12 or more carbon atoms and a (meth)acrylate unit having a urethane group,
the acrylic polymer is a copolymer of a monomer mixture comprising an alkyl (meth)acrylate (A) having an alkyl group of 12 or more carbon atoms and a reactive (meth)acrylate (B) having a functional group capable of reacting with an amino group, wherein the urethane group is introduced by a reaction between the functional group capable of reacting with an amino group, an amino alcohol and a polyvalent isocyanate compound, and
the mass ratio within the acrylic polymer between the copolymer portion and the introduced urethane group portions is within a range from 60:40 to 99:1.

Another aspect of the present invention provides a pigment dispersant for a non-aqueous pigment ink, wherein
the pigment dispersant is composed of an acrylic polymer comprising an alkyl (meth)acrylate unit having an alkyl group of 12 or more carbon atoms and a (meth)acrylate unit having a urethane group, and is insoluble in solvents having a 50% distillation point of 150° C. or higher,
the acrylic polymer is a copolymer of a monomer mixture comprising an alkyl (meth)acrylate (A) having an alkyl group of 12 or more carbon atoms and a reactive (meth)acrylate (B) having a functional group capable of reacting with an amino group, wherein the urethane group is introduced by a reaction between the functional group capable of reacting with an amino group, an amino alcohol and a polyvalent isocyanate compound, and
the mass ratio within the acrylic polymer between the copolymer portion and the introduced urethane group portions is within a range from 60:40 to 99:1.

Effects of Invention

The non-aqueous ink according to the present invention (hereafter also referred to as simply "the ink") uses, as a pigment dispersant, non-aqueous resin dispersion microparticles composed of an acrylic polymer comprising an alkyl (meth)acrylate unit having an alkyl group of 12 or more carbon atoms and a (meth)acrylate unit having a urethane group. These non-aqueous resin dispersion microparticles undergo a powerful interaction (adsorption) with the pigment, and therefore image show-through on the printed item can be reduced, and the storage stability of the ink can be improved. Moreover, because even a small amount of the non-aqueous resin dispersion microparticles is capable of generating a satisfactory pigment dispersion effect, the viscosity of the ink can be suppressed to a low level, thereby enabling the discharge stability to be improved when the ink is used as an inkjet ink.

BEST MODE FOR CARRYING OUT THE INVENTION

The ink according to the present invention comprises, as essential components, a pigment, a non-aqueous solvent (hereafter also referred to as simply "the solvent"), and non-aqueous resin dispersion microparticles (NAD, hereafter also referred to as "NAD microparticles") having a pigment dispersion capability as a pigment dispersant.

The NAD microparticles are composed of an acrylic polymer (or more specifically a urethane-modified acrylic polymer) comprising an alkyl (meth)acrylate unit having an alkyl group of 12 or more carbon atoms and a (meth)acrylate unit having a urethane group, and this polymer does not dissolve in the non-aqueous solvent used in the ink, but rather forms microparticles within the ink. Here, the term "(meth)acrylate" includes both acrylate and methacrylate.

The NAD microparticles form a core/shell structure composed of a core portion (a polar portion) that does not dissolve in the non-aqueous solvent of the ink, and a shell portion (a low-polarity portion) that is positioned at the solvent side of each microparticle and is solvated. It is thought that the core portion that is insoluble in the solvent has a role of improving the separation of the solvent and the pigment following printing, thereby preventing the pigment from penetrating into the interior of the paper together with the solvent, which enables the pigment to be retained at the paper surface, thus improving the print density. In contrast, it is thought that the shell portion (steric repulsion layer) has a role of enhancing the dispersion stability within the solvent, enabling the formation of the particle dispersion system.

Due to the inclusion of a long-chain alkyl group of 12 or more carbon atoms, the aforementioned alkyl (meth)acrylate unit exhibits excellent affinity with the non-aqueous solvent, thereby enhancing the dispersion stability within the non-aqueous solvent and performing the role of the shell portion. The alkyl chain of the ester portion may be either a linear or branched chain. Although there are no particular restrictions on the upper limit for the number of carbon atoms within this alkyl group, for reasons including availability of the raw material, the number of carbon atoms is preferably not more than 25.

Examples of the alkyl group of 12 or more carbon atoms include a dodecyl group, tridecyl group, tetradecyl group, pentadecyl group, hexadecyl group, heptadecyl group, octadecyl group, nonadecyl group, eicosanyl group, heneicosanyl group, docosanyl group, isododecyl group or isooctadecyl group. A plurality of these groups may also be included.

As a result of containing a urethane group (urethane bond) that has a high polarity and adsorbs the pigment, namely a carbamate ester portion ($H_2NCOOR$ or $RNHCOOR$), the aforementioned (meth)acrylate unit having a urethane group encapsulates the pigment to form the core portion (the solvent-insoluble portion) of the NAD microparticles.

The urethane groups form side chains (branches) off the main chain (backbone) of the acrylic polymer together with the above long-chain alkyl groups. These urethane group-containing branches may be polyurethanes formed from repeating urethane bonds, thereby forming branch polymers.

There are no particular restrictions on the molecular weight (mass average molecular weight) of the acrylic polymer, although if the ink is to be used as an inkjet ink, then from the viewpoint of achieving favorable ink dischargeability, the molecular weight is preferably within a range from approximately 10,000 to 100,000, and is more preferably from approximately 20,000 to 80,000.

The glass transition temperature (Tg) of the acrylic polymer is preferably not higher than room temperature, and is more preferably 0° C. or lower. This ensures that when the ink is fixed on the recording medium, film formation can be promoted at room temperature.

There are also no particular restrictions on the particle size of the NAD microparticles, but when used within an inkjet ink, the particle size of the NAD microparticles must be sufficiently small compared with the nozzle diameter, and is typically not more than 0.3 μm, and preferably not more than 0.1 μm.

The acrylic polymer is preferably produced from a copolymer (hereafter, this copolymer is also referred to as "the backbone polymer") of a monomer mixture comprising an alkyl (meth)acrylate (A) having an alkyl group of 12 or more carbon atoms (hereafter also referred to as "the monomer (A)"), and a reactive (meth)acrylate (B) having a functional group capable of reacting with an amino group (hereafter also referred to as "the monomer (B)"), by introducing urethane groups into the copolymer via a reaction between the functional group capable of reacting with an amino group, an amino alcohol and a polyvalent isocyanate compound.

Specific examples of the alkyl (meth)acrylate (A) having a long-chain alkyl group of 12 or more carbon atoms, and preferably 12 to 25 carbon atoms, include lauryl (meth)acrylate, cetyl (meth)acrylate, stearyl (meth)acrylate, behenyl (meth)acrylate, isolauryl (meth)acrylate and isostearyl (meth)acrylate. A plurality of these (meth)acrylates may also be included.

Preferred examples of the functional group capable of reacting with an amino group within the reactive (meth)acrylate (B) include a glycidyl group, vinyl group and (meth)acryloyl group.

A preferable example of the monomer (B) having a glycidyl group is glycidyl (meth)acrylate, whereas preferable examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. A plurality of these reactive (meth)acrylates (B) may also be included.

Besides the aforementioned monomers (A) and (B), the monomer mixture may also include another monomer (C) capable of undergoing copolymerization with the monomers (A) and (B), provided inclusion of the monomer (C) does not impair the effects of the present invention.

Examples of this monomer (C) include styrene-based monomers such as styrene and α-methylstyrene, vinyl acetate, vinyl benzoate, vinyl ether-based monomers such as butyl vinyl ether, maleate esters, fumarate esters, acrylonitrile, methacrylonitrile and α-olefins. Further, alkyl (meth)acrylates in which the alkyl chain length is less than 12 carbon atoms may also be used, including 2-ethylhexyl (meth)acrylate, isooctyl (meth)acrylate and tert-octyl (meth)acrylate. These monomers may be used individually, or in combinations of two or more compounds.

The amount of the alkyl (meth)acrylate (A) in the above monomer mixture is preferably not less than 30% by mass, more preferably within a range from 40 to 95% by mass, and most preferably from 50 to 90% by mass.

The amount of the reactive (meth)acrylate (B) is preferably within a range from 1 to 30% by mass, and more preferably from 3 to 25% by mass.

The amount of the monomer (C) other than the monomers (A) and (B) is preferably not more than 60% by mass, and more preferably within a range from 10 to 40% by mass.

For the monomer (C), the use of a monomer (C1) having a β-diketone group or (β-keto ester group is preferred. Including such a monomer (C1) enables the viscosity of the ink to be reduced. This means that when selecting a solvent for the ink, there are fewer restrictions on the viscosity of the solvent itself, thereby expanding the range of non-aqueous solvents that may be selected. Further, in those cases where fixing resins or additives are added to the ink according to need, the permissible increase in the ink viscosity caused by adding such components is expanded, resulting in a greater degree of freedom when determining the ink formulation.

Moreover, including the monomer (C1) enables functional groups having an ionic group to be introduced into the backbone polymer. Generally, introducing ionic groups into a low-polarity non-aqueous solvent causes an increase in the ink viscosity, but the existence of the monomer (C1) is able to suppress this viscosity increase. The inclusion of the monomer (C1) also contributes to electrostatic aggregation and fixation of the ink upon contact with the recording medium, resulting in improved print density and suppression of show-through.

Moreover, by overprinting a black ink containing the monomer (C1) on top of a cyan ink, a printed item with a higher print density can be obtained with good suppression of image show-through. The inventors of the present invention found that this effect was more marked when the backbone polymer included the monomer (C1) than when the backbone polymer did not include the monomer (C1).

In the monomer (C1), preferred examples of the β-diketone group include an acetoacetyl group and a propionylacetyl group, whereas preferred examples of the β-keto ester group include an acetoacetoxy group and a proionylacetoxy group, although these are not exhaustive lists.

Preferred examples of the monomer (C1) include (meth) acrylates and (meth)acrylamides comprising a β-diketone group or β-keto ester group in the ester chain. Specific examples include acetoacetoxyalkyl (meth)acrylates such as acetoacetoxyethyl (meth)acrylate, hexadione (meth)acrylate, and acetoacetoxyalkyl (meth)acrylamides such as acetoacetoxyethyl (meth)acrylamide. These monomers may be used individually, or in combinations of two or more compounds.

When included, the amount of the monomer (C1) within the monomer mixture is preferably within a range from 3 to 30% by mass, and more preferably from 5 to 20% by mass in view of the effects obtained by adding the monomer (C1) and the storage stability of the resulting ink.

The monomers described above can be polymerized easily by conventional radical copolymerization. The reaction is preferably conducted as either a solution polymerization or a dispersion polymerization.

In such cases, in order to ensure that the molecular weight of the acrylic polymer following polymerization satisfies the preferred range mentioned above, the use of a chain transfer agent during polymerization is effective. Examples of compounds that can be used as this chain transfer agent include thiols such as n-butyl mercaptan, lauryl mercaptan, stearyl mercaptan and cyclohexyl mercaptan.

Examples of polymerization initiators that may be used include conventional thermal polymerization initiators, including azo compounds such as AIBN (azobisisobutyronitrile) and peroxides such as t-butyl peroxybenzoate and t-butylperoxy-2-ethylhexanoate (Perbutyl O, manufactured by NOF Corporation). Alternatively, a photopolymerization initiator may be used in which irradiation with an active energy beam is used to generate radicals.

Petroleum-based solvents (such as aroma-free (AF) solvents) and the like can be used as the polymerization solvent used in a solution polymerization. This polymerization solvent is preferably one or more solvents selected from among those solvents (listed below) that can be used, as is, for the non-aqueous solvent within the ink.

During the polymerization reaction, other typically employed polymerization inhibitors, polymerization accelerators and dispersants and the like may also be added to the reaction system.

Subsequently, urethane groups are introduced into the obtained copolymer (the backbone polymer) by reacting the functional group capable of reacting with an amino group with an amino alcohol and a polyvalent isocyanate compound. The amino group of the amino alcohol reacts with, and bonds to, the functional group capable of reacting with an amino group within the monomer (B). The isocyanate ester group ($R^1N{=}C{=}O$) of the polyvalent isocyanate compound then undergoes an addition reaction with the hydroxyl group of the amino alcohol in the manner illustrated below, thus yielding a urethane group (urethane bond) (a carbamate ester: $R^1NHCOOR$):

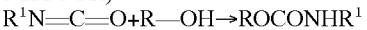

wherein R— represents the amino alcohol portion bonded to the functional group of the backbone polymer.

In this manner, urethane groups that function as pigment adsorption groups are introduced into the backbone polymer, which has no pigment adsorption capability.

Examples of the amino alcohol include monomethylethanolamine, diethanolamine and diisopropanolamine. Of these, dialkanolamines (secondary alkanolamines) represented by a general formula $(HOR)_2NH$ (wherein R is a divalent hydrocarbon group) are preferred, as they provide two hydroxyl groups, enabling the number of urethane groups formed to be increased. A combination of a plurality of these amino alcohols may also be used.

From the viewpoint of introducing an appropriate amount of urethane groups, this amino alcohol is preferably reacted in an amount within a range from 0.05 to 1 molar equivalents, and more preferably 0.1 to 1 molar equivalents, relative to the amount of the functional group capable of reacting with an amino group within the monomer (B). When the amount of the amino alcohol is less than 1 molar equivalent, unreacted functional groups will remain in some of the monomer (B) units, but it is thought that these residual functional groups act as pigment adsorption groups.

Examples of the polyvalent isocyanate compound include aliphatic, alicyclic and aromatic compounds, such as 1,6-diisocyanatohexane, 1,3-bis(isocyanatomethyl)benzene, 1,3-bis(isocyanatomethyl)cyclohexane, and 1,5-naphthalene diisocyanate. A plurality of these compounds may also be used in combination.

In order to ensure that no unreacted raw materials or the like remain following introduction of the urethane groups via reaction of the polyvalent isocyanate compound with the hydroxyl groups, the polyvalent isocyanate compound is preferably reacted in an amount that is substantially equimolar (0.98 to 1.02 molar equivalents) with the amount of hydroxyl groups contained with the supplied raw material.

In this manner, urethane side chains (grafts) that are insoluble in the solvent are formed at the amino alcohol sites bonded to the monomer (B) units within the copolymer portion (backbone polymer) that is soluble in the solvent, and these urethane side chains form dispersion particle nuclei. The final result of this process is the formation of polymer particles (NAD microparticles) enveloped within a shell structure (the backbone polymer) that can undergo solvation within the solvent.

In the above reaction, a polyhydric alcohol is preferably also added, so that the polyhydric alcohol and the polyvalent isocyanate compound are reacted. By adding a polyhydric alcohol, the urethane group formation can be repeated, enabling polyurethane side chains (namely, branch polymers) that function as higher polarity side chains to be obtained.

Examples of the polyhydric alcohol include ethylene glycol, propylene glycol, dipropylene glycol, 1,3-propanediol, polyethylene glycol and polypropylene glycol. A plurality of these polyhydric alcohols may also be used.

The polyhydric alcohol is important for controlling the size of the NAD particles, and as the amount of the polyhydric alcohol is increased, the NAD particles increase in size. However, if the particle size increases excessively, then the discharge stability and pigment dispersibility of the ink tend to deteriorate, and therefore the amount of the polyhydric alcohol relative to the amino alcohol is preferably within a range from 0 to 20 molar equivalents, and more preferably from 1 to 10 molar equivalents.

The mass ratio between the copolymer portion (backbone polymer) and the introduced urethane group portions (branches or branch polymers) within the acrylic polymer is preferably within a range from 60:40 to 99:1, and is more preferably from 70:30 to 99:1. The mass of the copolymer portion within the acrylic polymer represents the combined mass of the monomers used in the copolymerization, whereas the mass of the introduced urethane group portions represents the combined mass of the amino alcohol and the polyvalent isocyanate compound used in the grafting reaction, or in those cases where a polyhydric alcohol is also used, represents the combined mass of the amino alcohol, the polyvalent isocyanate compound and the polyhydric alcohol.

The obtained NAD microparticles themselves exhibit an excellent pigment dispersion capability, and therefore the amount of the NAD microparticles may be less than that of conventional pigment dispersants, and no other separate pigment dispersant needs to be added. As a result, the types of problems typically associated with the addition of a polymer-based pigment dispersant, namely an increase in the viscosity of the ink and a deterioration in the storage stability, can be suppressed, and the discharge stability within an inkjet recording system can be improved. Moreover, favorable storage stability can be achieved not only under normal operating conditions, but also under high-temperature conditions.

Examples of pigments that may be used for a black ink include carbon blacks such as furnace black, lamp black, acetylene black and channel black, metals or metal oxides such as copper, iron and titanium oxide, and organic pigments such as orthonitroaniline black. These pigments may be used either individually, or in combinations of two or more different pigments.

Examples of pigments that may be used for color inks include toluidine red, permanent carmine FB, disazo orange PMP, lake red C, brilliant carmine 6B, quinacridone red, dioxane violet, orthonitroaniline orange, dinitroaniline orange, vulcan orange, chlorinated para red, brilliant fast scarlet, naphthol red 23, pyrazolone red, barium red 2B, calcium red 2B, strontium red 2B, manganese red 2B, barium lithol red, pigment scarlet 3B lake, lake bordeaux 10B, anthocyn 3B lake, anthocyn 5B lake, rhodamine 6G lake, eosine lake, iron oxide red, naphthol red FGR, rhodamine B lake, methyl violet lake, dioxazine violet, naphthol carmine FB, naphthol red M, fast yellow AAA, fast yellow 10G, disazo yellow AAMX, disazo yellow AAOT, disazo yellow AAOA, disazo yellow HR, isoindoline yellow, fast yellow G, disazo yellow AAA, phthalocyanine blue, Victoria pure blue, basic blue 5B lake, basic blue 6G lake, fast sky blue, alkali blue R toner, peacock blue lake, Prussian blue, ultramarine, reflex blue 2G, reflex blue R, alkali blue G toner, brilliant green lake, diamond green thioflavine lake, phthalocyanine green G, green gold, phthalocyanine green Y, iron oxide powder, rust powder, zinc white, titanium oxide, calcium carbonate, clay, barium sulfate, alumina white, aluminum powder, bronze powder, daylight fluorescent pigments, and pearl pigments. These pigments may be used either individually, or in arbitrary mixtures.

From the viewpoints of discharge stability and storage stability, the average particle size of the pigment is preferably not more than 300 nm, more preferably not more than 150 nm, and most preferably 100 nm or less. In this description, the average particle size of the pigment refers to the value measured using a dynamic light-scattering particle size distribution measurement apparatus LB-500 manufactured by Horiba, Ltd.

The term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by mass of the solvent is evaporated. From the viewpoint of safety, the use of a solvent for which this 50% distillation point is at least 160° C., and particularly 230° C. or higher, is preferred.

For example, examples of preferred non-polar organic solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of the aromatic hydrocarbon solvents include Nisseki Cleansol G (alkylbenzene) manufactured by Nippon Oil Corporation and Solvesso 200 manufactured by Exxon Mobil Corporation.

Examples of solvents that can be used as the polar organic solvent include esters solvent (or ester-based solvents), alcohols solvent (or alcohol-based solvents), higher fatty acids solvent (or higher fatty acid-based solvents), ethers solvent (or ether-based solvents), and mixtures thereof. Specific examples include:

esters solvent containing 14 or more carbon atoms within each molecule, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate;

alcohols solvent containing 12 or more carbon atoms within each molecule, such as isomyristyl alcohol, isopalmityl alcohol, isostearyl alcohol and oleyl alcohol;

higher fatty acids solvent such as isononanoic acid, isomyristic acid, hexadecanoic acid, isopalmitic acid, oleic acid and isostearic acid; and ethers solvent such as diethylene glycol monobutyl ether, ethylene glycol monobutyl ether, propylene glycol monobutyl ether and propylene glycol dibutyl ether.

These non-aqueous solvents may be used either individually, or in mixtures of two or more different solvents.

The ink may also include other arbitrary components in amounts that do not impair the effects of the present invention.

For example, resins that may be added besides the above NAD microparticles include acrylic resins, styrene-acrylic resins, styrene-maleic acid resins, rosin-based resins, rosin ester-based resins, ethylene-vinyl acetate resins, petroleum resins, coumarone-indene resins, terpene phenol resins, phenolic resins, urethane resins, melamine resins, urea resins, epoxy resins, cellulose-based resins, vinyl chloride acetate resins, xylene resins, alkyd resins, aliphatic hydrocarbon resins, butyral resins, maleic acid resins, fumaric acid resins, hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, aromatic sulfonic acid-formalin condensate salts, polyoxyethylene alkyl phosphate esters, polyoxyethylene nonylphenyl ethers, polyester polyamines, and stearyl amine acetate.

Appropriate amounts of nozzle blockage prevention agents, antioxidants, conductivity modifiers, viscosity modifiers, surface tension modifiers and oxygen absorbers and the like may also be added. There are no particular restrictions on the specific variety of these additives, and the types of materials typically used within this technical field may be used.

The amount of the pigment within the ink is typically within a range from 0.01 to 20% by mass, and from the viewpoints of print density and ink viscosity, is preferably within a range from 1 to 15% by mass, and more preferably from 5 to 10% by mass.

In terms of ensuring favorable pigment dispersibility, the amount of the NAD microparticles within the ink is preferably not less than 0.1% by mass, and is more preferably 2% by mass or greater. However, if the amount of the NAD microparticles is too high, then not only does the ink viscosity become overly high, but the storage stability under high-temperature conditions also tends to worsen, and therefore the amount of the NAD microparticles is preferably not more than 20% by mass, and is more preferably 10% by mass or less. The amount of the NAD microparticles within the ink is most preferably within a range from 3 to 8% by mass.

The mass of the NAD microparticles (or the total mass of resin in those cases where the ink includes other resins besides the NAD microparticles) relative to a value of 1 for the mass of the pigment is preferably at least 0.5 from the viewpoint of ensuring a favorable pigment dispersibility effect, and is preferably not more than 1 from the viewpoints of improving the ink viscosity and avoiding discharge faults caused by changes in the ink over time.

When used within an inkjet recording system, the ideal range for the viscosity of the ink varies depending on factors such as the diameter of the discharge head nozzles and the discharge environment, but at 23° C., is preferably within a range from 5 to 30 mPa·s, and more preferably from 5 to 15 mPa·s. An ink viscosity of approximately 10 mPa·s is the most desirable for use within an inkjet recording apparatus. Here, the viscosity is measured at 23° C. by raising the shear stress from 0 Pa at a rate of 0.1 Pa/s, and refers to the measured value at 10 Pa.

A pigment dispersant for a non-aqueous pigment ink according to the present invention is composed of an acrylic polymer comprising an alkyl (meth)acrylate unit having an alkyl group of 12 or more carbon atoms and a (meth)acrylate unit having a urethane group, and is insoluble in solvents having a 50% distillation point of 150° C. or higher.

The acrylic polymer is preferably a copolymer of a monomer mixture comprising an alkyl (meth)acrylate (A) having an alkyl group of 12 or more carbon atoms and a reactive (meth)acrylate (B) having a functional group capable of reacting with an amino group, wherein urethane groups have been introduced therein by a reaction between the functional group capable of reacting with an amino group, an amino alcohol and a polyvalent isocyanate compound, and the mass ratio between the copolymer portion and the introduced urethane group portions is preferably within a range from 60:40 to 99:1.

When added to a non-aqueous pigment ink, this pigment dispersant forms NAD microparticles that exhibit the type of pigment dispersion effect described above. As a result, a non-aqueous pigment ink can be provided which yields increased print density for printed items, and also offers excellent storage stability.

Although there are no particular restrictions on the printing method used with the ink according to the present invention, printing is preferably conducted using an inkjet recording apparatus. The inkjet printer may employ any of various printing systems, including a piezo system, electrostatic system or thermal system. In those cases where an inkjet recording apparatus is used, the ink according to the present invention is discharged from the inkjet head based on a digital signal, and the discharged ink droplets are adhered to a recording medium.

The ink according to the present invention can be used favorably even under low-temperature conditions, and exhibits excellent discharge stability when used within an inkjet recording system.

In the obtained printed item, the pigment within the ink is inhibited from penetrating into the interior of the printing paper, and is rather retained at the surface of the paper, resulting in a high print density.

EXAMPLES

A more detailed description of the present invention is provided below based on a series of examples, although the present invention is in no way limited by these examples. In the following description, the units "% by mass" are abbreviated as simply "%".

Example 1

(1) Synthesis of Copolymers (Backbone Polymers a to f)

A 300 ml four-neck flask was charged with 75 g of AF-4 (a naphthene-based solvent, manufactured by Nippon Oil Corporation), and the temperature was raised to 110° C. under a stream of nitrogen gas and with constant stirring. Subsequently, with the temperature held at 110° C., a mixture containing 16.7 g of AF-4 and 2 g of Perbutyl O (t-butylperoxy-2-ethylhexanoate, manufactured by NOF Corporation) was added dropwise to a monomer mixture with the composition shown in Table 1 over a period of 3 hours. Subsequently, with the temperature maintained at 110° C., additional 0.2 g samples of Perbutyl O were added after stirring for an additional one hour and two hours respectively. The reaction mixture was aged for a further one hour at 110° C., and was then diluted with 10.6 g of AF-4, yielding a colorless and transparent solution of a backbone polymer a to f with a non-volatile fraction of 50%.

The mass average molecular weight (determined by a GPC method and referenced against polystyrene standards) of each of the obtained backbone polymers was within a range from 20,000 to 23,000.

TABLE 1

| | | Backbone polymer composition | | | | | |
|---|---|---|---|---|---|---|---|
| | Monomer (g) | Backbone polymer a | Backbone polymer b | Backbone polymer c | Backbone polymer d | Backbone polymer e | Backbone polymer f |
| VMA (monomer A) | Behenyl methacrylate (Mw: 339) | 50 | 50 | 50 | 0 | 0 | 50 |
| LMA (monomer A) | Dodecyl methacrylate (Mw: 254) | 0 | 0 | 0 | 50 | 0 | 0 |
| EHMA (monomer C) | 2-ethylhexyl methacrylate (Mw: 198) | 35 | 45 | 25 | 35 | 85 | 15 |
| AAEM (monomer C1) | 2-acetoacetoxyethyl methacrylate (Mw: 214) | 0 | 0 | 0 | 0 | 0 | 20 |
| GMA (monomer B) | Glycidyl methacrylate (Mw: 142) | 15 | 5 | 25 | 15 | 15 | 15 |

Details of the monomers used are as listed below.

Monomer (A): VMA (number of carbon atoms within the alkyl group: 22): behenyl methacrylate (manufactured by NOF Corporation)

Monomer (A): LMA (number of carbon atoms within the alkyl group: 12): dodecyl methacrylate Monomer (C): EHMA: (number of carbon atoms within the alkyl group: 8): 2-ethylhexyl methacrylate Monomer (B): GMA: glycidyl methacrylate Monomer (C1): AAEM: 2-acetoacetoxyethyl methacrylate (manufactured by Nippon Synthetic Chemistry Industry Co., Ltd.)

Unless stated otherwise, all reagents were manufactured by Wako Pure Chemical Industries, Ltd. (this also applies in the following description).

(2) Production of Non-Aqueous Dispersions Containing NAD Microparticles

A 500 mL four-neck flask was charged with 81 g of isooctyl palmitate (IOP, manufactured by Nikko Chemicals Co., Ltd.), 200 g of the solution of the backbone polymer a obtained in (1) above (solid fraction within AF-4 solvent: 50%), 4.0 g of propylene glycol and 2.8 g of diethanolamine, and the temperature was raised to 110° C. under a stream of nitrogen gas and with constant stirring. The temperature was held at 110° C. for one hour to enable the reaction between the glycidyl groups of the backbone polymer a and the diethanolamine to proceed to completion. Subsequently, 0.2 g of dibutyltin dilaurate was added, and a mixture containing 10.2 g of Takenate 600 (1,3-bis(isocyanatomethyl)cyclohexane, manufactured by Mitsui Chemicals, Inc.) and 91.8 g of IOP was then added dropwise to the flask over a period of one hour. Following completion of the dropwise addition, the temperature was raised to 120° C., the reaction was allowed to proceed for 6 hours, and the reaction mixture was then cooled, yielding a non-aqueous dispersion D1 having a solid fraction (NAD microparticles) of 30%.

Using the same method, non-aqueous dispersions D2 to D9 were produced with the formulations shown in Table 2. The amounts listed for the backbone polymers in Table 2 represent solid fraction amounts.

The mass average molecular weight (determined by a GPC method and referenced against polystyrene standards) for each of the obtained acrylic polymers (including the branch polymers) was within a range from 22,000 to 26,000.

TABLE 2

| | | Non-aqueous dispersion formulations | | | | | | | | | |
|---|---|---|---|---|---|---|---|---|---|---|---|
| | | D1 | D2 | D3 | D4 | D5 | D6 | D7 | D8 | D9 | D10 |
| Backbone polymer (g) | Backbone polymer a | 100.0 | 0.0 | 0.0 | 0.0 | 100.0 | 100.0 | 100.0 | 0.0 | 0.0 | 100.0 |
| | Backbone polymer b | 0.0 | 100.0 | 0.0 | 0.0 | 0.0 | 0.0 | 0.0 | 0.0 | 0.0 | 0.0 |
| | Backbone polymer c | 0.0 | 0.0 | 100.0 | 0.0 | 0.0 | 0.0 | 0.0 | 0.0 | 0.0 | 0.0 |
| | Backbone polymer d | 0.0 | 0.0 | 0.0 | 100.0 | 0.0 | 0.0 | 0.0 | 0.0 | 0.0 | 0.0 |
| | Backbone polymer e | 0.0 | 0.0 | 0.0 | 0.0 | 0.0 | 0.0 | 0.0 | 0.0 | 100.0 | 0.0 |
| | Backbone polymer f | 0.0 | 0.0 | 0.0 | 0.0 | 0.0 | 0.0 | 0.0 | 100.0 | 0.0 | 0.0 |
| Branch polymer (g) | Propylene glycol | 4.0 | 5.4 | 2.7 | 4.0 | 10.3 | 16.0 | 0.0 | 4.0 | 4.0 | 0.0 |
| | Diethanolamine | 2.8 | 3.7 | 1.9 | 2.8 | 2.8 | 2.8 | 2.8 | 2.8 | 2.8 | 0.0 |
| | Diisocyanate | 10.2 | 24.4 | 10.1 | 10.2 | 30.7 | 45.5 | 5.1 | 10.2 | 10.2 | 0.0 |
| Solvent (g) | AF-4 | 100.0 | 100.0 | 100.0 | 100.0 | 100.0 | 100.0 | 100.0 | 100.0 | 100.0 | 100.0 |
| | IOP | 172.8 | 211.6 | 167.6 | 172.8 | 251.8 | 283.4 | 251.8 | 172.8 | 172.8 | 168.3 |
| Mass ratio of backbone polymer/branch polymers (note) | | 85/15 | 75/25 | 77/23 | 85/15 | 70/30 | 61/39 | 93/7 | 85/15 | 85/15 | 100/0 |
| Mass ratio (%) of monomer B within backbone polymer | | 15 | 5 | 25 | 15 | 15 | 15 | 15 | 15 | 15 | 15 |
| Molar ratio (equivalents) of amino alcohol relative to monomer B | | 0.25 | 1.0 | 0.10 | 0.25 | 0.25 | 0.25 | 0.25 | 0.25 | 0.25 | 0 |

(Note):
Polyurethane side chains

In a separate preparation, an acrylic-modified polymer (NAD microparticles) in which the branch polymers were also acrylic polymers was synthesized in the manner described below for the purpose of comparison.

A 500 mL four-neck flask was charged with 100 g of IOP and 200 g of the solution of the backbone polymer a obtained in (1) above (solid fraction within AF-4 solvent: 50%), and the temperature was raised to 110° C. under a stream of nitrogen gas and with constant stirring. Subsequently, with the temperature held at 110° C., a mixture containing 7.6 g of acrylic acid, 5.0 g of methyl methacrylate, 5.0 g of butyl acrylate and 0.5 g of Perbutyl O (t-butylperoxy-2-ethylhexanoate, manufactured by NOF Corporation) was added dropwise to the flask over a period of 15 minutes. Following completion of the dropwise addition, the reaction was allowed to proceed for 4 hours with the temperature held at 110° C. The reaction mixture was then cooled and diluted with 74.4 g of IOP, yielding a non-aqueous dispersion D10 having a solid fraction of 30%.

The solid fraction and solvent composition for each of the non-aqueous dispersions D1 to D10 were as follows.
D1: solid fraction 30%, AF-4: 25.7%, IOP 44.3%
D2: solid fraction 30%, AF-4: 22.5%, IOP 47.5%
D3: solid fraction 30%, AF-4: 25.7%, IOP 44.3%
D4: solid fraction 30%, AF-4: 26.2%, IOP 43.8%
D5: solid fraction 30%, AF-4: 19.9%, IOP 50.1%
D6: solid fraction 30%, AF-4: 18.4%, IOP 51.6%
D7: solid fraction 30%, AF-4: 21.8%, IOP 54.8%
D8: solid fraction 30%, AF-4: 25.7%, IOP 44.3%
D9: solid fraction 30%, AF-4: 25.5%, IOP 44.5%
D10: solid fraction 30% AF-4: 25.5%, IOP 445. %

(3) Preparation of Inks

Example 1

12.5 g of the prepared dispersion D1, 5.0 g of a pigment (carbon black MA11, manufactured by Mitsui Chemicals, Inc.), 7.9 g of AF-4 and 7.9 g of IOP were mixed, zirconia beads (diameter: 0.5 mm) were added, and the mixture was dispersed for 120 minutes using a rocking mill (manufactured by Seiwa Technical Lab Co., Ltd.). Following dispersion, the zirconia beads were removed, the dispersion was filtered sequentially through 3.0 μm and 0.8 μm membrane filters to remove any contaminants and coarse particles, and the mixture was diluted with 8.4 g of AF-4 and 8.4 g of IOP, thus completing preparation of an ink (pigment content: 10%) in which the pigment was dispersed by the NAD microparticles.

Examples 2 to 8, Comparative examples 1 to 4

Using the blend amounts shown in Table 3, inks of each of the examples and comparative examples were prepared in the same manner as example 1.

In comparative examples 2 and 3, a solution of the backbone polymer a (solid fraction: 50%) and Solsperse 28000 (manufactured by The Lubrizol Corporation, solid fraction: 100%) respectively were used instead of the non-aqueous dispersion.

TABLE 3

Inks and evaluations thereof (Blend amount/g)

| | | Example 1 | Example 2 | Example 3 | Example 4 | Example 5 | Example 6 | Example 7 | Example 8 | Comparative example 1 | Comparative example 2 | Comparative example 3 | Comparative example 4 |
|---|---|---|---|---|---|---|---|---|---|---|---|---|---|
| Pigment | | 5 | 5 | 5 | 5 | 5 | 5 | 5 | 5 | 5 | 5 | 5 | 5 |
| Non-aqueous dispersion | D1 | 12.5 | | | | | | | | | | | |
| | D2 | | 12.5 | | | | | | | | | | |
| | D3 | | | 12.5 | | | | | | | | | |
| | D4 | | | | 12.5 | | | | | | | | |
| | D5 | | | | | 12.5 | | | | | | | |
| | D6 | | | | | | 12.5 | | | | | | |
| | D7 | | | | | | | 12.5 | | | | | |
| | D8 | | | | | | | | 12.5 | | | | |
| | D9 | | | | | | | | | 12.5 | | | |
| | D10 | | | | | | | | | | | | 12.5 |
| Backbone polymer a solution | | | | | | | | | | | 7.5 | | |
| Solsperse 28000 | | | | | | | | | | | | 3.75 | |
| Diluent during dispersion | AF-4 | 7.9 | 7.9 | 7.9 | 7.9 | 7.9 | 7.9 | 7.9 | 7.9 | 7.9 | 7.9 | 12.3 | 7.9 |
| | IOP | 7.9 | 7.9 | 7.9 | 7.9 | 7.9 | 7.9 | 7.9 | 7.9 | 7.9 | 12.9 | 12.3 | 7.9 |
| Viscosity modifying solvent | AF-4 | 8.4 | 8.4 | 8.4 | 8.4 | 8.4 | 8.4 | 8.4 | 8.4 | 8.4 | 8.4 | 8.3 | 8.4 |
| | IOP | 8.4 | 8.4 | 8.4 | 8.4 | 8.4 | 8.4 | 8.4 | 8.4 | 8.4 | 8.4 | 8.3 | 8.4 |
| Physical properties | Average particle size (nm) | 86 | 96 | 86 | 89 | 94 | 92 | 90 | 82 | 107 | 168 | 88 | 123 |
| | Viscosity (mPa·s) | 12.4 | 12.3 | 12.9 | 12.7 | 12.8 | 14.1 | 12.7 | 10.3 | 12.9 | 13.9 | 12.4 | 15.1 |
| Evaluation | Print density (surface OD) | A | A | A | A | A | A | A | A | B | C | C | B |
| | Print density (rear surface OD) | A | A | A | A | A | A | A | A | A | C | C | B |
| | C composite image print density (surface OD) | B | B | B | B | B | B | B | A | B | C | C | B |

TABLE 3-continued

Inks and evaluations thereof

| | | Example 1 | Example 2 | Example 3 | Example 4 | Example 5 | Example 6 | Example 7 | Example 8 | Comparative example 1 | Comparative example 2 | Comparative example 3 | Comparative example 4 |
|---|---|---|---|---|---|---|---|---|---|---|---|---|---|
| | | (Blend amount/g) | | | | | | | | | | | |
| C composite image print density (rear surface OD) | | A | A | A | B | B | B | B | A | B | C | D | B |
| Storage stability | | A | A | A | A | A | A | B | A | C | C | A | B |
| Discharge stability | | A | A | A | A | A | B | A | A | B | C | A | B |

All of the prepared inks exhibited viscosity and pigment particle size properties that were within the respective ideal ranges for use as inkjet inks. The ink particle size was measured using a dynamic light-scattering particle size distribution measurement apparatus LB-500 manufactured by Horiba, Ltd. The viscosity of the ink represents the viscosity at 10 Pa when the shear stress was raised from 0 Pa at a rate of 0.1 Pa/s at a temperature of 23° C., and was measured using a controlled stress rheometer RS75 manufactured by Haake GmbH (cone angle: 1°, diameter: 60 mm).

<Ink Storage Stability (70° C.)>

Each of the inks was placed inside a sealed container and left to stand for 4 weeks at 70° C., and following this standing period, the changes in the ink viscosity and particle size were measured, and the measurement results were evaluated in the manner described below.

Viscosity/particle size change:
[(Viscosity/particle size after 4 weeks×100)/(Initial viscosity/particle size)]−100(%)

Inks for which the changes in the viscosity and the particle size were both less than 5% were evaluated as A, inks for which at least one of the changes in the viscosity and the particle size was at least 5% but less than 10% were evaluated as B, and inks for which at least one of the changes in the viscosity and the particle size was 10% or greater were evaluated as C.

Each of the prepared inks was loaded into a printer HC5500 (manufactured by Riso Kagaku Corporation), and the print density and discharge stability were evaluated by performing printing onto plain paper (Riso lightweight paper, manufactured by Riso Kagaku Corporation). The HC5500 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

<Ink Discharge Stability>

100 copies of a solid image with dimensions of 51 mm (600 nozzle widths) in the main scanning direction×260 mm in the sub-scanning direction were printed in a continuous manner. Unprinted portions caused by ink discharge faults were observed as white bands within the image. The discharge stability was evaluated against the criteria shown below, by counting the number of these white bands that occurred across the 100 printed items (equivalent to a total of 60,000 nozzles).

No discharge faults: A, less than 5 white bands: B, 5 or more white bands: C

<Printed Item Density>

The OD values for the printed surface and the rear surface of a solid image obtained in the same manner as that described above were measured using an optical densitometer (RD920, manufactured by Macbeth Corporation), and the image densities were then evaluated against the criteria below. A high surface OD value indicates high image density, and a low rear surface OD value indicates minimal show-through, both of which are desirable.

Print density (surface OD)
A: 1.10 or greater, B: 1.05 to 1.09, C: 1.04 or less
Print density (rear surface OD)
A: 0.25 or less, B: 0.26 to 0.30, C, 0.31 or greater Next, the print density obtained when the ink was overprinted on top of a cyan ink was evaluated in the manner described below.

Using the same printer and plain paper as those described above, a cyan ink (HC ink S-4367 Cyan <C>, manufactured by Riso Kagaku Corporation) was first used to print a solid image, and a black ink from one of the examples or comparative examples was then used to print a solid image on top of the cyan image. The OD values for the printed surface and the rear surface of thus obtained carbon ink composite image (C composite image) were measured in the same manner as described above, and were evaluated against the criteria below.

Print density (surface OD)
A: 1.22 or greater, B: 1.15 to 1.21, C: 1.08 to 1.14, D: 1.07 or less
Print density (rear surface OD)
A: 0.30 or less, B: 0.31 to 0.34, C, 0.35 to 0.39, D: 0.40 or greater The results of all the above evaluations are shown in Table 3.

Even without the addition of a separate pigment dispersant, each of the inks of the examples exhibited excellent storage stability under high-temperature conditions, and yielded printed items of increased density while maintaining favorable discharge stability.

In contrast, in comparative example 1, the chain length of the side-chain alkyl groups of the backbone polymer was comparatively short, containing only 8 carbon atoms, and therefore the dispersion stability within the solvent was poor, and the discharge stability and storage stability deteriorated.

In comparative example 2, dispersion was performed using a resin in which no branch polymers (urethane groups) were bonded to the backbone polymer, but the pigment dispersibility was poor, the discharge stability and storage stability were inferior, and an increase in the density of the printed items was unobtainable.

Comparative example 3 represents a conventional pigment ink using a commercially available pigment dispersant, and in this case, although favorable storage stability was obtained, the pigment tended to penetrate into the paper together with the solvent and the pigment dispersant, meaning an increase in the density of the printed items was unobtainable.

Comparative example 4 represents an example using NAD microparticles having acrylic side chains (branches), but the type of superior performance observed in the examples for the NAD microparticles having urethane side chains was unobtainable.

In example 8, which used NAD microparticles of a polymer in which the backbone polymer also included the monomer (C1), an additional reduction in the ink viscosity was achieved, and the print density of the obtained carbon composite image was particularly superior.

The present application is based upon and claims the benefit of priority from prior Japanese Application 2008-135274 filed on May 23, 2008, and prior Japanese Application 2008-294829 filed on Nov. 18, 2008. The present application is related to the subject matter disclosed in these prior applications, the entire contents of which are incorporated by reference herein.

It should be noted that, besides those already mentioned above, various modifications and variations can be made in the aforementioned embodiments without departing from the novel and advantageous features of the present invention. Accordingly, it is intended that all such modifications and variations are included within the scope of the appended claims.

The invention claimed is:

1. A non-aqueous pigment ink comprising a pigment, a non-aqueous solvent, and non-aqueous resin dispersion microparticles having a pigment dispersion capability, wherein
the non-aqueous resin dispersion microparticles are an acrylic polymer comprising an alkyl (meth)acrylate unit having an alkyl group of 12 or more carbon atoms and a (meth)acrylate unit having a urethane group,
the acrylic polymer is a copolymer of a monomer mixture comprising an alkyl (meth)acrylate (A) having an alkyl group of 12 or more carbon atoms and a reactive (meth)acrylate (B) having a functional group capable of reacting with an amino group, wherein the urethane group is introduced by a reaction between the functional group capable of reacting with an amino group, an amino alcohol and a polyvalent isocyanate compound, and
a mass ratio within the acrylic polymer between the copolymer portion and the introduced urethane group portions is within a range from 60:40 to 99:1.

2. The non-aqueous pigment ink according to claim 1, wherein the functional group capable of reacting with an amino group is at least one selected from the group consisting of a glycidyl group, a vinyl group and a (meth)acryloyl group.

3. The non-aqueous pigment ink according to claim 1, wherein the amino alcohol is reacted in an amount within a range from 0.05 to 1 molar equivalents relative to an amount of the functional group capable of reacting with an amino group.

4. The non-aqueous pigment ink according to claim 1, wherein the monomer mixture comprises 1 to 30% by mass of the reactive (meth)acrylate (B).

5. The non-aqueous pigment ink according to claim 1, wherein the reaction for forming the urethane group further comprises a reaction between the polyvalent isocyanate compound and a polyhydric alcohol.

6. The non-aqueous pigment ink according to claim 1, wherein the monomer mixture further comprises a monomer having a β-diketone group or β-keto ester group.

7. The non-aqueous pigment ink according to claim 6, wherein the monomer mixture comprises 3 to 30% by mass of the monomer having a β-diketone group or β-keto ester group.

8. A pigment dispersant for a non-aqueous pigment ink, wherein
the pigment dispersant is composed of an acrylic polymer comprising an alkyl (meth)acrylate unit having an alkyl group of 12 or more carbon atoms and a (meth)acrylate unit having a urethane group, and is insoluble in solvents having a 50% distillation point of 150° C. or higher,
the acrylic polymer is a copolymer of a monomer mixture comprising an alkyl (meth)acrylate (A) having an alkyl group of 12 or more carbon atoms and a reactive (meth) acrylate (B) having a functional group capable of reacting with an amino group, wherein the urethane group is introduced by a reaction between the functional group capable of reacting with an amino group, an amino alcohol and a polyvalent isocyanate compound, and
a mass ratio within the acrylic polymer between the copolymer portion and the introduced urethane group portions is within a range from 60:40 to 99:1.

* * * * *